United States Patent
Lyon et al.

(10) Patent No.: US 8,251,279 B2
(45) Date of Patent: Aug. 28, 2012

(54) VARIABLE DATA BARCODE

(75) Inventors: Geoffrey M Lyon, Menlo Park, CA (US); Alan A McReynolds, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 223 days.

(21) Appl. No.: 12/495,678

(22) Filed: Jun. 30, 2009

(65) Prior Publication Data
US 2010/0327051 A1    Dec. 30, 2010

(51) Int. Cl.
*G06F 17/00* (2006.01)
(52) U.S. Cl. ............... 235/375; 235/462.01; 235/462.1
(58) Field of Classification Search .................. None
See application file for complete search history.

(56) References Cited

U.S. PATENT DOCUMENTS

| | | | |
|---|---|---|---|
| 4,864,302 A * | 9/1989 | Bowers | 341/13 |
| 5,959,422 A * | 9/1999 | Kang | 318/561 |
| 6,685,094 B2 * | 2/2004 | Cameron | 235/468 |
| 2007/0152060 A1 * | 7/2007 | Kiliccote | 235/462.09 |
| 2009/0020609 A1 * | 1/2009 | Cohen et al. | 235/462.01 |
| 2009/0230182 A1 * | 9/2009 | Nemet et al. | 235/375 |

* cited by examiner

*Primary Examiner* — Thien M Le
*Assistant Examiner* — Sonji Johnson
(74) *Attorney, Agent, or Firm* — Denise A. Lee

(57) ABSTRACT

A variable data barcode label, comprising sequence of barcodes integrated onto a substrate, the sequence of barcodes including a identification sequence and a reference sequence which defines the readable region of the barcode label; and a sensor integrated onto the substrate, wherein the output of the sensor measurement is located in the variable data field of the barcode label and is optically viewable by an optical reading device.

20 Claims, 3 Drawing Sheets

VARIABLE DATA BARCODE

BACKGROUND

Data centers contain large numbers of servers and other assets. Identifying computer assets in the physical world is often problematic in practice, where manually entered inventory information is often updated and subject to undocumented changes. Hence, it can sometimes be difficult for operations staff to quickly locate a particular asset, especially if it has been moved during a prior facility reconfiguration. Within many facilities, racks of identical and differing devices are often difficult to distinguish from each other.

Further, monitoring environmental conditions (temperature, humidity, shock loading, etc.) of the assets in a datacenter must be performed in order to ensure environmental limits are maintained in order to ensure proper operation of the assets. Monitoring of temperature is a critical concern in the datacenter and different temperature dependent labels or sensors are available. One available type of temperature dependent sensors are thermo-sensitive markers that change color (typically from white to black) when a specific threshold temperature is reached. After a specific temperature is reached, the sensor retains its color change indefinitely. Such labels are often used to indicate whether a specific asset has exceeded its operating temperature anytime in it's history. Another type of sensor is a reversible thermal label (for example, a liquid crystal thermo-foil). For this type of sensor, the current temperature status is shown typically along a moving temperature scale. The current temperature is highlighted along the scale and as the temperature increases or decreases the current temperature measurement is highlighted.

Based on the sensed temperature data, actions may be taken in the data center to prevent overheating of assets. However, keeping track of the assets and their current temperature status is difficult.

BRIEF DESCRIPTION OF THE DRAWINGS

The figures depict implementations/embodiments of the invention and not the invention itself. Some embodiments of the invention are described, by way of example, with respect to the following Figures.

DETAILED DESCRIPTION

The described invention describes an integrated barcode label that provides environmental sensor data with a unique identifier. The barcode label is comprised of: (1) a sequence of barcodes printed on a label, the barcode sequence including a unique identification sequence; and (2) a variable data sensor, integrated into a variable data field on the barcode label, wherein the unique identification sequence and the output of the variable data sensor are optically viewable by an optical reading device. By augmenting the identification features of barcodes with optically readable environmental sensors, assets in the datacenter can be tagged with labels that identify the asset and monitor its immediate environmental conditions.

Figure 1:
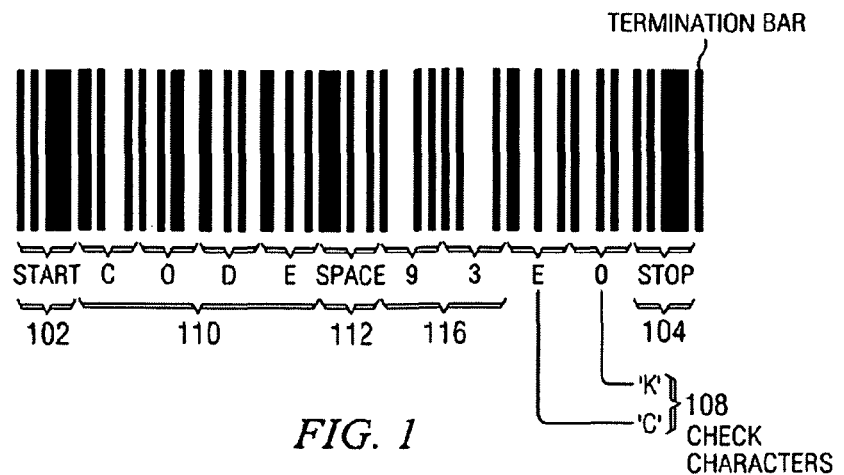
FIG. 1 shows an example of a standard barcode label format.

Referring to FIG. 1, this shows an example of a standard format for barcode label encoding. A barcode is digital data encoded into a sequence of vertical bars with variable spacing and/or thickness. Barcode formats 100 typically include unique start 102 and stop 104 characters that enable the barcode reader to time and frame the enclosed data sequence. Checksum characters 108 are normally added to validate the digital data that has been read.

Referring to FIG. 1, the start code 102 is followed by an identification code or sequence 110. The identification sequence that is typically used to uniquely identify the data center asset or object to which the barcode label is attached. The barcode format may include a space 112. In FIG. 1, the space 112 is followed by a data section 116 followed by a checksum 108 followed by a stop code 104. The data section 116 typically provides additional information about the asset or object. For example, the data section code may indicate that the asset is a server, manufactured by Company X, having model number Y.

Referring to FIG. 1, the barcodes shown may be vertical bars of different thicknesses. When read by a barcode reader (laser), they output a square wave pattern. From the output square wave pattern and knowing the unique characters associated with the start and stop codes, the system is able to determine the clock frequency and decode the encoded characters. The checksum is used to verify that the encoded data has been read properly.

Figure 2A:
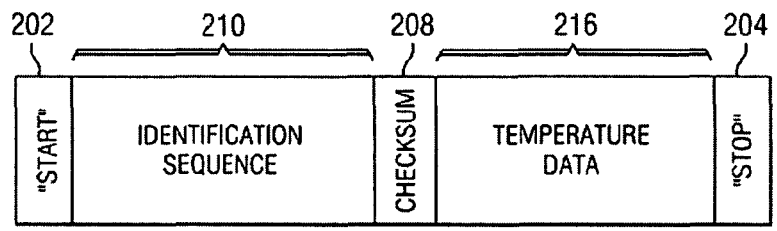
FIG. 2A shows an integrated variable data barcode format in accordance with embodiments of the present invention.

FIG. 2A shows an integrated variable data barcode format in accordance with embodiments of the present invention. Comparing the variable data barcode format shown in FIG. 2A to the standard barcode format shown in FIG. 1, both formats include start (102, 202) and stop (104, 204) codes, an identifier field (110, 210), a data section (116, 216) and a checksum (108, 208). However, there are two major differences between the two formats and implementations shown in FIG. 1 and FIG. 2A. First, the data section (216) is not a static series of barcodes pre-printed on the barcode label (as is the data section in FIG. 1). Instead, the data region includes a sensor which outputs an optically viewable measurement that is variable -or dynamic (changes with time). Since the measurement data in the data field 216 in FIG. 2A represents a variable measurement that occurs after shipment of the label to the customer, it cannot be pre-printed as barcode data (like the fixed barcode data in FIG. 1) on the label before shipment to the end user.

The second major difference between the barcode label format shown in FIG. 1 and the barcode label format shown in FIG. 2A is that although there is a checksum field shown in the embodiment shown in FIG. 2A, the checksum can only be performed on the fixed portion of the variable data barcode. In other words, the checksum cannot be used to verify the variable data that is measured by the environmental sensor that is integrated into the variable data section of the barcode sequence.

Figure 2B:
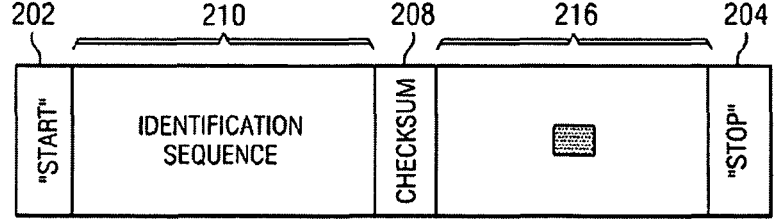
FIG. 2B shows an integrated variable data barcode according to the format shown in FIG. 2A where the variable data section is a temperature sensor in accordance with embodiments of the present invention.

FIG. 2B shows the variable data sensor barcode format shown in FIG. 2A where a temperature sensor is integrated into the variable data field of the barcode. Although the descriptions in the specification describe the invention with reference to a thermal sensor, any variable data sensor with optically viewable properties could be used. For example, an environmental sensor that measures or visually indicates humidity or shock levels could be integrated into the variable data section of the barcode.

In one embodiment, the variable data section is an environmentally sensitive region that provides an analog measurement currently being measured by the sensing portion (data) of the label. Referring to FIG. 2B, shows a dot or physical indicator of the temperature (output of the sensor). In the embodiment shown in FIG. 2B, the x axis of the barcode label acts as a temperature scale (as temperature increases the sensor indicator (the dot) moves to the right). Software in the system knows the scale for the sensor and calculates the temperature based on the position of the dot along the x axis. In another embodiment, the temperature measurement is output in the variable data field as a number indicating the current temperature value in degrees Farenheit or Celsius. For a numerical variable output, it might be more practical to use a camera as an optical reading device as opposed to a barcode reader. The optical reading device (or system software capable of communicating with the optical device) would have software capable of reading the numerical sensor output within the variable data field of the barcode.

Instructions of software for calculating the variable data measured by the sensor are loaded for execution onto a processor (not shown) on the optical reading device or asset capable of communicating with the optical reading device. In the embodiment shown in FIG. 3, where a dot or other physical indicator indicates the sensed temperature, barcode reader software (or software on asset capable of communicating with optical reader) can compute the temperature value based on the width and/or physical location of the physical indicator. The term CPU or processor includes microprocessors, microcontrollers, processor modules or subsystems (including one or more microprocessors or microcontrollers), or other control or computing devices. A "processor" can refer to a single component or to plural components.

In an alternative embodiment, the variable data section is an environmentally sensitive region that indicates a threshold measurement of the label. For the data center example, where we are particularly concerned with the asset overheating, it might be desirable to measure and optically indicate a threshold temperature that indicates overheating of the asset. It is anticipated that if the threshold temperature is met, operation of asset within the assets specifications would be in question. In one embodiment, it may be desirable to visually indicate a threshold measurement where the threshold reflects either the highest achieved reading or reaching the threshold value of the sensor.

By definition, the variable data section of the barcode label is variable or can change with time. The variable nature of the sensor measurements prevents a conventional checksum (pre-printed value (108) that allows for verification that the data was read accurately) from being performed on the variable data section of the barcode. Referring to FIG. 2B, in the described embodiment, the checksum 208 is only performed on the fixed portion (portion fixed or pre-printed on the barcode label before shipment to the end user) of the barcode. In the embodiment shown in FIG. 2B, the fixed portion of the barcode includes the identification barcode sequence 210. Thus in FIG. 2B, the checksum 208 can be used to verify that the fixed portion has been read properly. The checksum cannot verify that the variable data section 216 has been read properly by the barcode reader.

Referring to FIG. 2B shows the checksum 208 immediately following the identification field 210 of the barcode label. Although the checksum may be positioned anywhere in the barcode, the positioning shown follows traditional practice where the checksum (see FIG. 1) is placed after the bits it is verifying as being accurately read. In the embodiment shown in FIGS. 2A-2B, since a checksum cannot be performed on the variable data measured in the variable data section of the barcode, the checksum is positioned immediately after the unique identifier section of the barcode label. As previously stated, the checksum 208 can provide verification of the accuracy of the identification sequence 210.

In one embodiment and as shown in FIG. 2, the barcode label is a 1D label. However, the present invention can also be implemented as a 2D barcode. In the previous description, a variable data sensor was positioned within the variable data field of the barcode between the start sequence and the stop sequence. However, the start and stop sequences are just part of a reference (or reference sequence) that marks or defines the area of the barcode label to be scanned or read by an optical reader.

In the 1D barcode embodiment, the reference sequence includes the start sequence and stop sequences which mark the boundaries of the 1D barcode. In the 2D barcode embodiment, the reference sequence includes an alignment pattern or alignment markers which mark or define the area of the 2D label to be read. In the 1D case, the barcode label is typically scanned by a laser barcode reader. In the 2D case, the barcode label is typically read by a camera or other image capturing device.

Figure 3A:
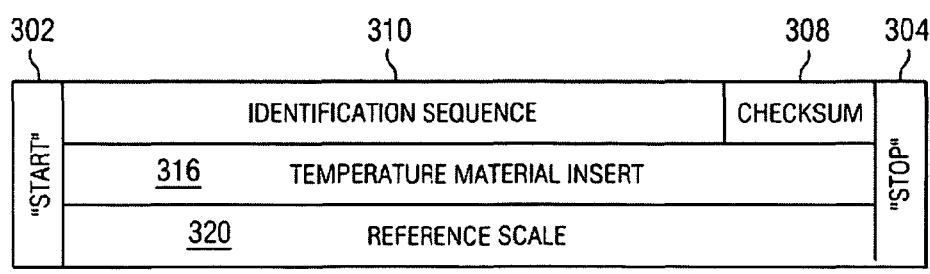
FIG. 3A shows a stacked variable data barcode format in accordance with embodiments of the present invention.
Figure 3C:
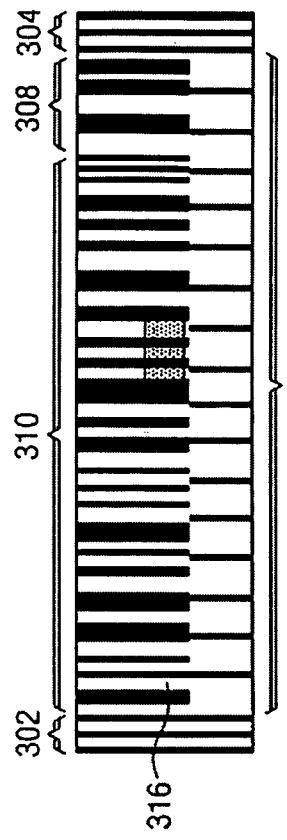
FIG. 3C shows a stacked integrated variable data barcode in accordance with embodiments of the present invention.
Figure 3B:
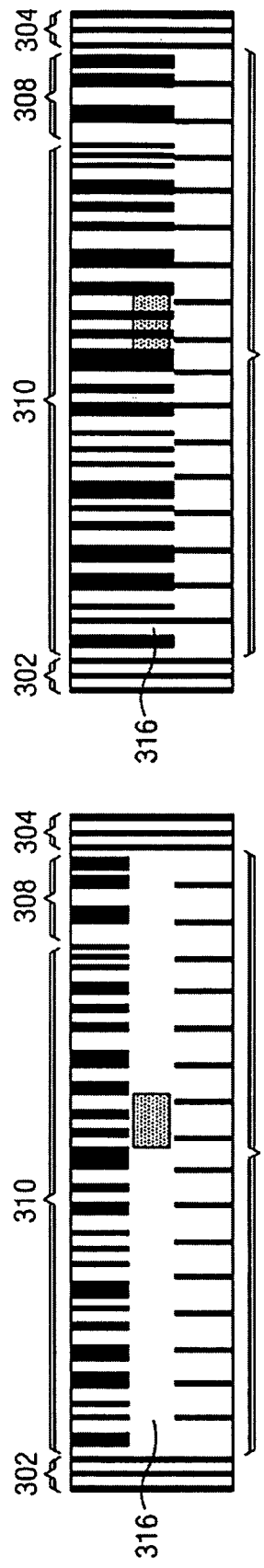
FIG. 3B shows a stacked integrated variable data barcode in accordance with embodiments of the present invention.

FIG. 3A shows a stacked variable data sensor barcode format in accordance with embodiments of the present invention. The data included in the variable data barcode format shown in FIG. 3A is similar to the data shown in FIG. 2A, except that 1) the data is in a stacked format and 2) the barcode includes a reference scale.

Referring to FIG. 3A shows a stacked variable data format comprised of three horizontal layers framed by start and stop bars. The start 302 and stop 304 barcodes are like those shown in FIG. 2A, however, the data format of the three horizontal layers are different. The first horizontal layer includes the unique identification sequence 310 similar to the identification sequence 210 shown in FIG. 2A. The first horizontal layer also includes a checksum 308 which parallels the checksum 208 in FIG. 2A. The second horizontal layer includes the variable sensor 316. The third horizontal layer includes a reference scale 320.

The reference scale 320 in the stacked barcode has two primary purposes. First, it provides a reference scale (similar to the scale on a thermometer) that makes it easy for a user viewing the scale to estimate the current temperature reading. Second, the reference scale provides a series of evenly spaced bars that can be used to correct the skew in the read rate of the barcode and improve the accuracy of the clocking.

In one embodiment, the temperature sensor shown in FIG. 3A is a reversible thermo-foil structure where the current temperature is represented by a dot which moves to the right (in the positive x direction) as the temperature increases and to the left (in the negative x direction) as the temperature decreases. One advantage of the format shown in FIG. 3A compared to the format shown in FIG. 2A, is that the format provides for a relatively longer horizontal barcode strip. This increases the area that the thermal gradient can be shown by and can potentially improve the reading accuracy. The format shown in FIG. 3A is more complex to read using a barcode scanner. (Because the data layers are stacked into three horizontal stripes, in one embodiment the barcode scanner reads each horizontal layer with a different scan for each layer.) Therefore, it may be more practical to use a camera as the optical reader for this format as opposed to a laser barcode reader. Assuming sufficient resolution of the camera, software could compute the temperature based on the position of the dot in the barcode.

Although we cannot use the barcodes in the present invention to verify the accuracy of the measurement of the sensor, we can use the barcodes in the reference section to potentially correct for skew in the read rate of the barcode reader and improve the accuracy of the clocking. Correcting the skew in the read rate and improving clocking accuracy is valuable since one cause of invalid data reads is an inaccurate clocking speed. For example, if a user is reading a barcode using a barcode scanner and the scanner is bumped, the clocking could be off—and as a result the barcode data could be inaccurately read. For fixed data (as shown in FIG. 1), the checksum 108 would indicate an invalid read and the end user would know that the barcode label should be rescanned. However, since for the present invention there is no checksum available for the variable data field of the barcode, the reference scale 320 provides additional assurance that the sensor measurement is being read correctly.

In the present invention, we cannot validate the veracity of the variable data (temperature measurement.) In other words, we cannot tell if there was a smudge on the field where the variable data output by the sensor is located that would prevent an accurate reading by the barcode reader. In one embodiment, a redundant sensor or sensor is added to the variable data section of the barcode sensor. If the measurements of the redundant sensors are the same, this provides some additional verification that the sensor measurement was read correctly by the barcode reader.

Although the variable data fields are shown without barcodes extending thru them, in one embodiment barcodes extend thru the variable data field. For example, in the embodiment shown in FIG. 3B, the barcodes only extend thru the first horizontal layer. In an alternative embodiment shown in FIG. 3C, the barcodes could extend past the first horizontal layer thru the variable sensor data layer in the second horizontal stripe. In an alternative embodiment, the variable data sensor could be physically located in what is currently defined as the first and second horizontal layers or stripes. This means that essentially there would be only two stripes in the stacked sensor. A first stripe that includes an identification sequence bounded by a start and stop barcode sequence and a second stripe that includes the reference scale bounded by a start and stop barcode sequence. Since there would be only two horizontal stripes, only two scans by a conventional barcode reader would be required. Similarly, referring to FIG. 2A, in one embodiment, reference scale barcodes that extend thru the variable data field could be added. These additional barcodes would provide additional data that can be used by the system to provide additional calibration. Similarly, in an alternative embodiment, the reference scale in FIG. 3C could be eliminated, and the barcodes in the first stripe could extend through the entire label.

Figure 4A:
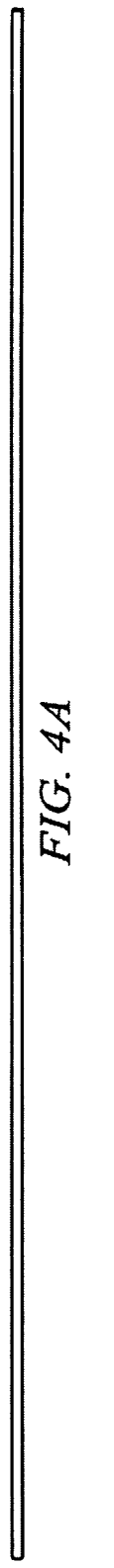
FIGS. 4A-4C show steps in the process of manufacturing a variable data barcode in accordance with embodiments of the present invention.
Figure 4B:
Figure 4C:

FIGS. 4A-4C show steps in the process of manufacturing an integrated variable data barcode in accordance with embodiments of the present invention. Referring to FIG. 4A, shows a cross-sectional view of a substrate, in the preferred embodiment a paper label. In one embodiment and as shown in FIG. 4B, a sensor (in our example, a thermal sensor) is attached to the paper label. Referring to FIG. 4C, after the sensor is attached, a barcode is printed over the sensor. In one embodiment, the sensor is printed onto the label in the same step that the barcode is printed. For example an inkjet printer may, in one or more passes or steps, print to the paper label the barcode and (using a thermally active ink) also print the thermal sensing region.

A further need within data center facilities is to ensure that the inlet temperature of such assets remains below a given threshold level. This is often specified in the operating procedures for the assets and becomes a requirement for their warranted support in many cases. In addition, excessive cooling results in wasted energy usage. Hence it is desirable to monitor the inlet temperature of airflow entering the racks, ideally on a per asset basis.

Figure 5A:
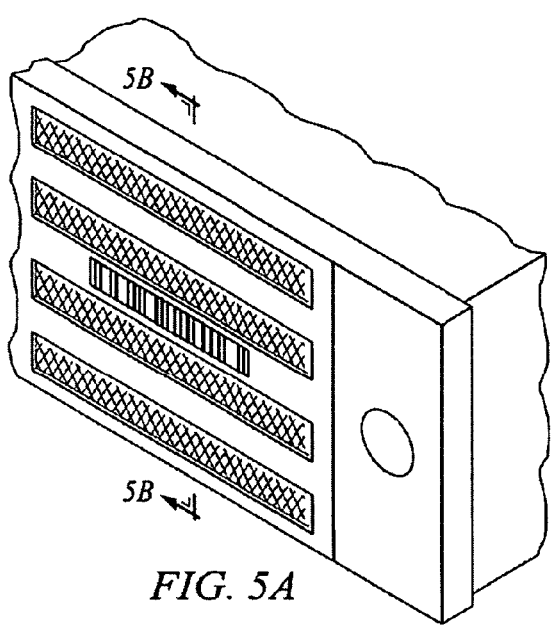
FIGS. 5A-5D show an integrated variable data sensor barcode label attached to an asset in a data center in accordance with embodiments of the present invention.
Figure 5B:
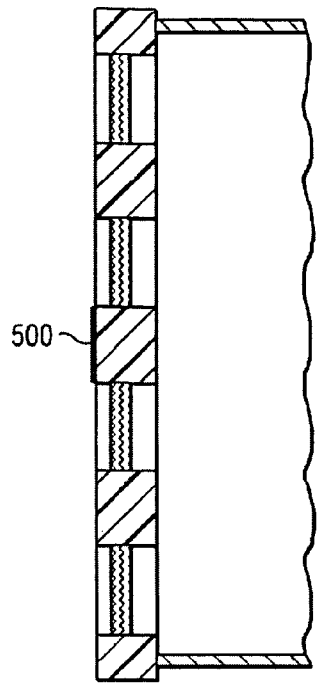
Figure 5C:
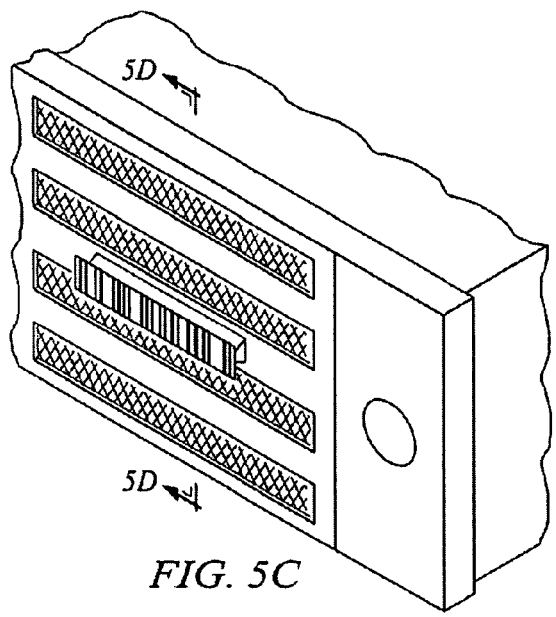
Figure 5D:
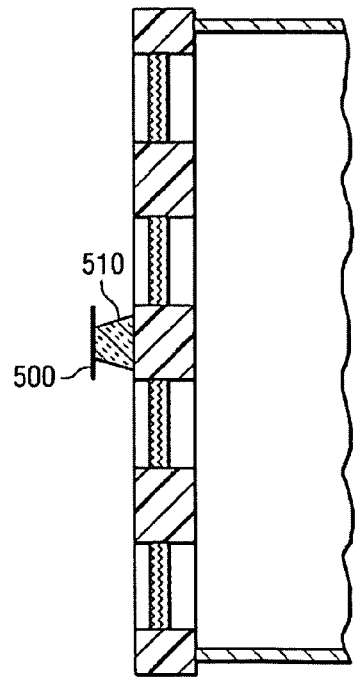

FIGS. 5A and 5C illustrate how the variable data barcode label 500 could be attached to the front face of the server to potentially monitor inlet temperature of the airflow. In the embodiment shown in FIG. 5A, the barcode label directly mounts to the front face of a server in between a number of inlet ventilation slots. In some cases, the close proximity of the barcode label to the asset may cause the label to respond to the asset's temperature, where it is often more appropriate to determine the inflowing air temperature. Referring to FIG. 5D shows how this could be overcome by mounting the barcode label on an insulating standoff 510. Separating the barcode label from the asset (at least from a thermal conductivity perspective) should cause the barcode label to trend more towards the inlet air temperature, unhindered by the surface temperature of the asset.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. For example, although the examples throughout this application describe the variable data barcode in a datacenters, this barcode clearly may have much broader application in areas. For example, the variable data barcode could be used for food safety applications. For example, for a food which has a temperature range which once reached would result in food spoilage, a barcode could be attached to the container holding the food item of interest.

The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:
1. A variable data barcode label, comprising:
   a fixed portion including an identification sequence, a reference sequence which defines a readable region of the barcode label, and a reference scale having marks, wherein the fixed portion is integrated onto a substrate; and
   a sensor integrated onto the substrate adjacent to the reference scale, wherein an output of the sensor is output in a variable data field of the barcode label, wherein the output is optically readable by an optical reading device, and wherein the output of the sensor is measured against the marks of the reference scale.
2. The variable data barcode label recited in claim 1, wherein the identification sequence is a ID barcode and the reference sequence includes a start sequence and a stop sequence for defining the area of the barcode label to be read.

3. The variable data barcode label recited in claim 1 is a 2D barcode label and the reference sequence includes at least one alignment marker for defining the area and orientation of the barcode to be read.

4. The variable data barcode label recited in claim 1, further including a checksum sequence for the fixed portion of the barcode label.

5. The variable data barcode label recited in claim 1, wherein the marks of the reference scale are evenly spaced.

6. The variable data barcode label recited in claim 1, wherein the reference scale extends through the variable data field of the barcode label.

7. The variable data barcode label recited in claim 1 wherein the output of the sensor is in different positions along the reference scale as the output of the sensor changes.

8. The variable data barcode label recited in claim 1, wherein the reference scale is used by the optical reader to correct a skew in a read rate of the optical reader.

9. The variable data barcode label recited in claim 1, wherein the barcode label is positioned on an asset, and wherein a thermal insulating layer is positioned between the asset and the barcode label.

10. The variable data barcode label recited in claim 1, further including a first stripe of data and a second stripe of data, wherein the first stripe of data includes the identification sequence and the second stripe of data includes the reference scale.

11. The variable data barcode label recited in claim 10, wherein the first stripe of data includes the variable data field of the barcode label, wherein the identification sequence of the first stripe extends through the sensor.

12. The variable data barcode recited in claim 1, further including a first stripe of data, a second stripe of data and a third stripe of data, wherein the first stripe of data includes the identification sequence, wherein the second stripe of data includes the variable data field and the third stripe of data includes the reference scale.

13. A variable data barcode format, comprising:
 a fixed portion including a reference sequence field for defining a readable region of a barcode, an identification sequence field, and a reference scale having marks; and
 a variable data field including a sensor located adjacent to the reference scale, wherein an output of the sensor is output in the variable data field, the output of the sensor being optically viewable, and wherein the output of the sensor is measured against the marks on the reference scale.

14. The variable data barcode format recited in claim 13 wherein the barcode is a 1D barcode and further wherein the reference sequence field includes a start field and a stop field, the reference sequence in the reference sequence field for defining the boundary or region of the barcode.

15. The variable data barcode format recited in claim 13 wherein the barcode is a 2D barcode and further wherein the reference field includes at least one alignment marker for defining the area and orientation of the barcode.

16. The variable data barcode format recited in claim 13 further including a checksum field, wherein the checksum field includes a checksum only for the fixed portion of the barcode.

17. The variable data barcode format recited in claim 13, wherein the marks of the reference scale are evenly spaced.

18. The variable data barcode format recited in claim 13, wherein the output of the sensor is in different positions along the reference scale as the output of the sensor changes.

19. The variable data barcode format recited in claim 13 wherein the reference scale is used by an optical reader, capable of optically viewing the barcode format, to correct for skew in the read rate of the optical reader.

20. A method of manufacturing a variable data barcode label, comprising the steps of:
 integrating an identification sequence, a reference sequence which defines a readable region of the barcode, and a reference scale having marks onto a substrate; and
 integrating a sensor onto the substrate adjacent to the reference scale, wherein an output of the sensor is output in a variable data field of the barcode, and wherein the output of the sensor is measured against the marks of the reference scale.

* * * * *

UNITED STATES PATENT AND TRADEMARK OFFICE
CERTIFICATE OF CORRECTION

| | |
|---|---|
| PATENT NO. | : 8,251,279 B2 |
| APPLICATION NO. | : 12/495678 |
| DATED | : August 28, 2012 |
| INVENTOR(S) | : Geoffrey M Lyon et al. |

It is certified that error appears in the above-identified patent and that said Letters Patent is hereby corrected as shown below:

In the Claims

In column 6, line 67, in Claim 2, delete "ID" and insert -- 1D --, therefor.

In column 8, line 11, in Claim 14, delete "ID" and insert -- 1D --, therefor.

Signed and Sealed this
Twenty-eighth Day of May, 2013

Teresa Stanek Rea
*Acting Director of the United States Patent and Trademark Office*